Oct. 6, 1942.    J. R. McLAUGHLIN    2,298,221
CUTTING MACHINE FOR COTTON STRIPS AND THE LIKE
Filed July 15, 1940    5 Sheets-Sheet 1
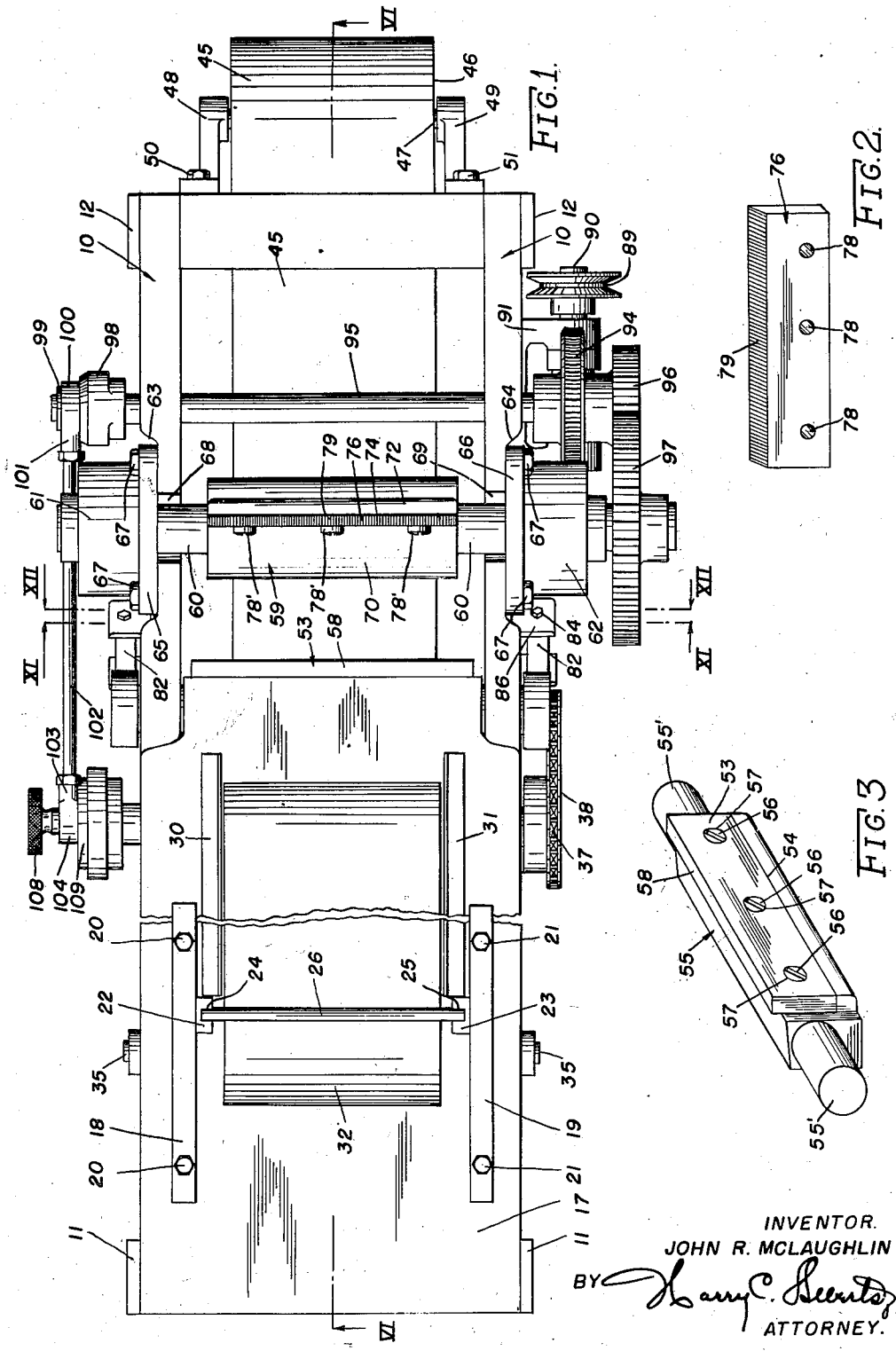
INVENTOR.
JOHN R. MCLAUGHLIN
BY Harry C. Seerts
ATTORNEY.

INVENTOR
JOHN R. MCLAUGHLIN.
BY
ATTORNEY.

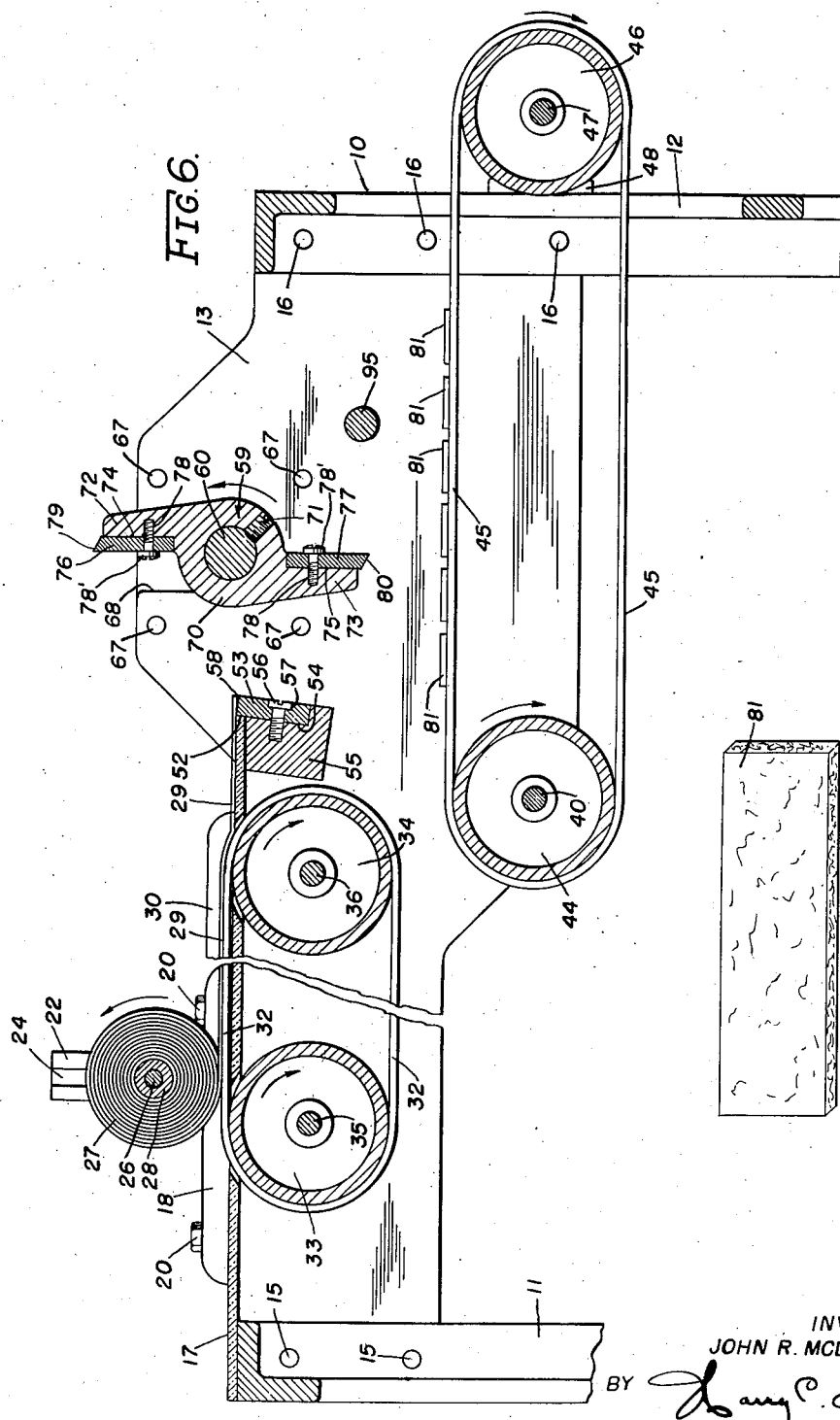

Oct. 6, 1942.   J. R. McLAUGHLIN   2,298,221
CUTTING MACHINE FOR COTTON STRIPS AND THE LIKE
Filed July 15, 1940   5 Sheets-Sheet 4
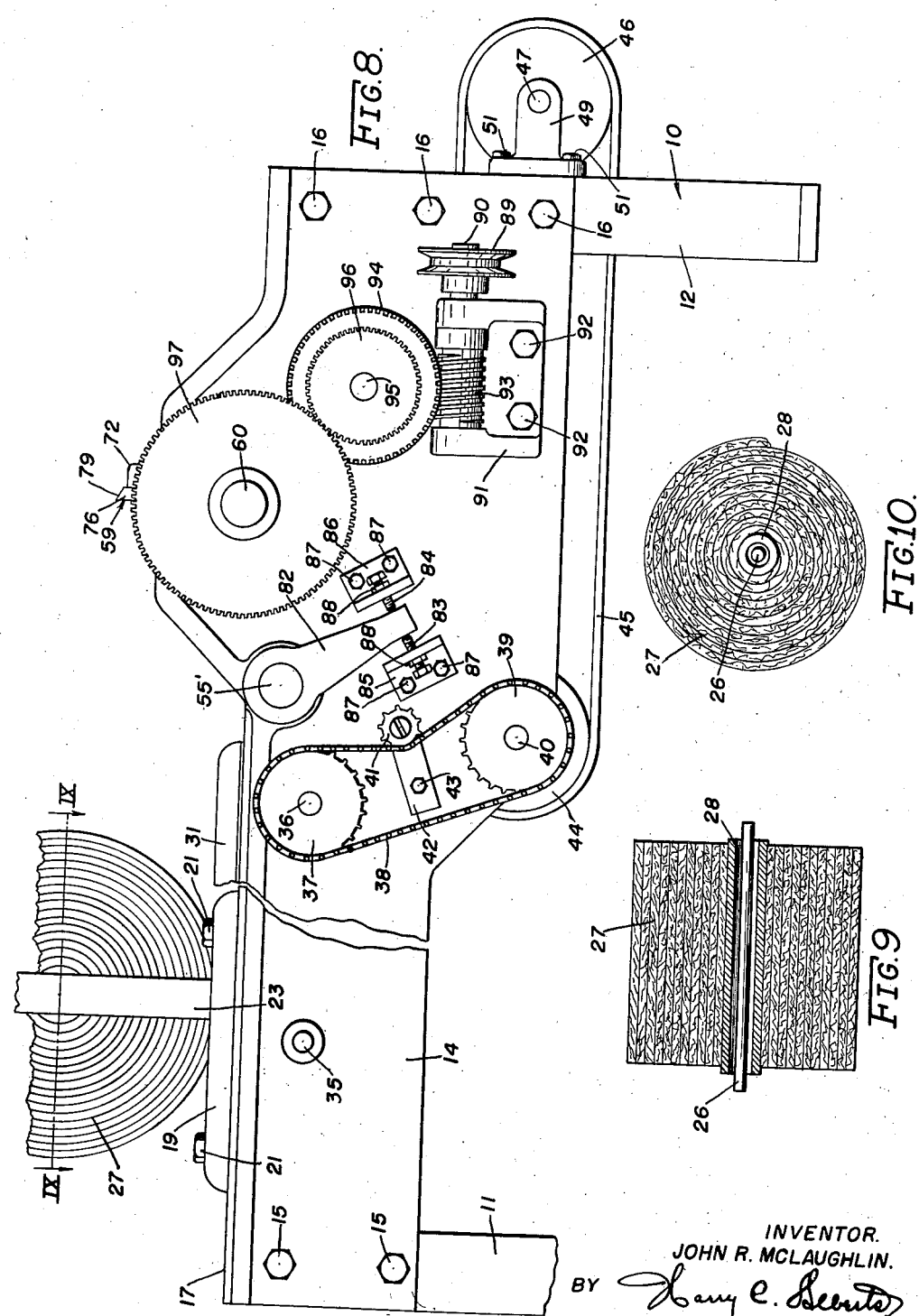
INVENTOR.
JOHN R. MCLAUGHLIN.
BY
ATTORNEY.

Oct. 6, 1942.  J. R. McLAUGHLIN  2,298,221
CUTTING MACHINE FOR COTTON STRIPS AND THE LIKE
Filed July 15, 1940  5 Sheets-Sheet 5

INVENTOR.
JOHN R. MCLAUGHLIN.
BY Harry C. Seeuter
ATTORNEY.

Patented Oct. 6, 1942

2,298,221

UNITED STATES PATENT OFFICE 2,298,221

CUTTING MACHINE FOR COTTON STRIPS AND THE LIKE

John R. McLaughlin, New Brunswick, N. J., assignor, by mesne assignments, to Tampax Incorporated, New York, N. Y., a corporation of Delaware Application July 15, 1940, Serial No. 345,604

3 Claims. (Cl. 164—68)

This invention relates to cutting machines and more particularly to cotton strip cutting devices, although it may be employed with equal advantage for other purposes.

It contemplates more especially the provision of a continuous cutting machine for loose texture sheet material such as cotton and similar materials to provide uniform lengths thereof without manual intervention.

There is a requirement for uniformity in cotton strips and similar sheet materials for conversion into articles of manufacture on a production basis. The handling of these materials in large production has created problems throughout their conversion into any desired article of manufacture. A noteworthy requirement for large numbers of uniform strips of sheet material such as cotton is the conversion thereof into catamenial device. The initial step is in the provision of uniform strips of cotton that is usually supplied in large rolls. The first step in the production operation is the conversion of this rolled cotton into uniform strips for their conversion into the desired form as a final article of manufacture for which the market demands uniformity, precision in size, and an adequate supply to carry on continuous production operations in the manufacture thereof.

One object of the present invention is to simplify the construction and improve the operation of cutting machines for segregating sheet material into uniform strips of predetermined size.

Another object is to provide a cutting machine that continuously converts sheet material such as cotton into uniform pieces without manual intervention or entailing any appreciable supervision.

Still another object is to provide an improved cutting machine that will convert rolled cotton into strips of predetermined size in a continuity of operations without manual intervention or supervision.

A further object is to provide an improved cutting machine that will convert soft sheet material such as cotton into uniform strips of predetermined size having a sharp outline.

A still further object is to provide an improved rotary cutter that is self-sharpening and imparts a sharp outline to the material in the conversion thereof into strips of predetermined size.

Still a further object is to provide a simple, inexpensive, and dependable cutter that converts sheet material into uniform strips for a continuity of operations without manual intervention.

Other objects and advantages will appear from the following description of an illustrative embodiment of the present invention.

In the drawings:

Figure 1 is a plan view of a continuous cutter embodying features of the present invention.

Figure 2 is a perspective view of an individual movable cutter blade constituting part of the device shown in Figure 1.

Figure 3 is a perspective view of a stationary blade mount utilized in conjunction with the instrumentalities shown in Figure 1.

Figure 6 is a sectional side view in elevation taken substantially along line VI—VI of Figure 1.

Figure 7 is a perspective view of a strip of sheet material that is severed from the roll with instrumentalities of the type shown in Figure 6.

Figure 8 is a fragmentary side view in elevation of the machine shown in Figure 1, parts thereof being broken away to clarify the showing.

Figure 9 is a sectional view in elevation taken substantally along line IX—IX of Figure 8, there being shown a roll of cotton or other sheet material capable of being converted into strips of predetermined size with the instrumentalities embodying features of the present invention.

Figure 10 is an end view in elevation of a roll of sheet material shown in Figure 9.

Figure 4:
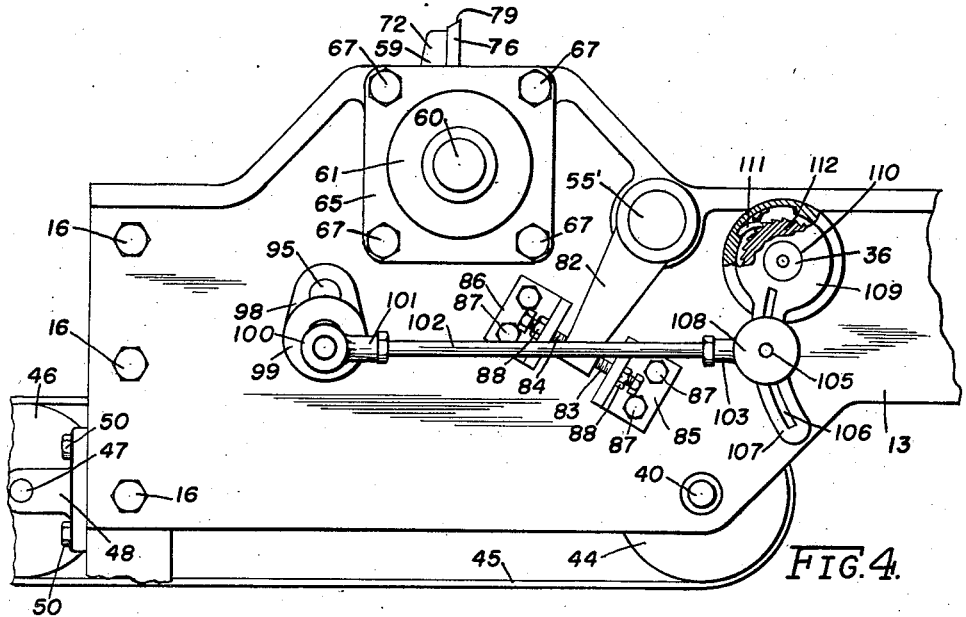
Figure 4 is a fragmentary enlarged side view in elevation of the machine shown in Figure 1.

The structure selected for illustration comprises a substantially rectangular frame 10 supported at any suitable elevation from the floor or other supporting surface by means of end standards 11 and 12 cast or otherwise shaped to present forward and rearward end members that are bolted or otherwise attached to the horizontal rectangular frame 10. Suitably shaped heavy side plates 13 and 14 are attached as at 15 and 16 to the end standards 11—12 to serve as supports for instrumentalities to be hereinafter described. A top surface plate 17 preferably thought not essentially of Bakelite or other suitable sanitary non-friction surface material, is fixed to the frame 10 to extend over the rearward half thereof to serve as a support for end brackets 18 and 19 anchored thereto as at 20 and 21.

Figure 12:
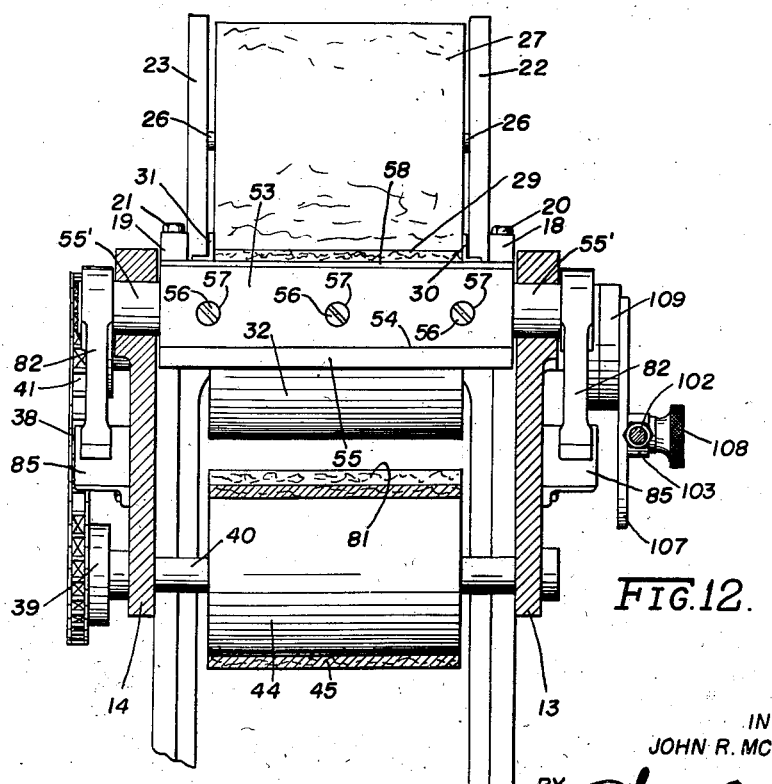
Figure 12 is a sectional view in elevation taken substantially along line XII—XII of Figure 1.

The end brackets 18 and 19 confront each other and present upstanding supports 22 and 23 that are suitably grooved as at 24 and 25 to carry a rod 26 therebetween. A roll of suitable sheet material 27 such as cotton usually in convolute or spiral form around a tubular core 28, is supported by the rod 26 to provide a continuous flat sheet 29 along the top surface plate 17 (Figure 12). Suitable guides such as confronting angle irons 30 and 31 are attached to the top surface plate 17 forwardly of the reel rod 26 to guide the continuous flat sheet 29 therebetween as such extends forwardly for support on an endless feeding belt 32.

The endless feeding belt or conveyor 32 extends between cylindrical rollers 33 and 34 that are mounted on shafts 35 and 36 journalled between the side plates 13—14. The forward cylindrical roller 34 is driven in a clockwise direction (viewed from Figures 6 and 8), this being effected by means of a sprocket 37 that is secured to an externally projecting portion of the shaft 36 to receive a sprocket chain 38 thereover. The sprocket chain 38 meshes with another sprocket 39 carried by a shaft 40 journalled near the lower edge of the side plates 13—14 proximate to the mid-section thereof. As shown, an idler sprocket pinion 41 is mounted on a plate 42 adjustably bolted as at 43 to the intermediate sprocket wheels 37—39 to the side plate 14 to maintain the sprocket chain 38 at the desired tension.

It is to be noted that the shaft 40 carries a cylindrical conveyor roller 44 which is mounted below the horizontally aligned conveyor rollers 33—34 and forwardly thereof to provide an endless belt conveyor 45 in conjunction with a forwardly disposed and horizontally aligned conveyor roller 46 journalled on the shaft 47 supported in bracket arms 48 and 49 (Figure 1) fixed, bolted or otherwise attached as at 50 and 51 to the forward standard 12. It will be observed, therefore, that the upper conveyor belt 32 feeds the sheet material 29 to the forward edge 52 of the top surface supporting plate 17 (Figure 6).

A stationary blade 53 fits within an offset notch 54 provided in a block 55 having end trunnions 55' (Figures 3 and 8) projecting for fixed support between the side plates 13—14 to depend from the forward edge region 52 of the horizontal frame plate 17. Threaded studs 56, in this instance three, extend through apertures 57 provided in the stationary blade 53 (Figures 2 and 6). As shown, the stationary blade 53 has a ground cutting surface 58 which is somewhat below the supporting surface of the frame plate 17 so that the flat sheet material 29 will be loosely suspended proximate to the cutting edge 58 of the stationary blade 53 to cooperate with a rotary cutter 59.

The rotary cutter 59 comprises, in this instance, a comparatively heavy shaft 60 journalled in bearings 61 and 62 fixed to the side plates 13—14. To accommodate the comparatively heavy bearings 61—62 on the main shaft 60, the frame 10 is inwardly recessed as at 63 and 64 in the region of the bearing 61—62 so that the flanges 65 and 66 thereof will rest therein. Suitably threaded studs 67 projecting through the flanges 65—66 of the bearings 61—62, these being circumferentially spaced to securely attach the bearings 61—62 in horizontal alignment for journalled support of the cutter shaft 60 that extends through openings 68 and 69 provided in the frame 10 and its side plates 13—14.

A knife mount 70 consisting of a solid body having a substantially cylindrical mid-section is axially bored to receive the shaft 60 therethrough. Set screws 71 extend through the body 70 to engage the shaft 60 so that the knife carrying body 70 will rotate therewith in a counterclockwise direction (viewed from Figure 6). As shown, the substantially circular knife carrying body 70 terminates in diametrically disposed arms 72 and 73, in this instance two, the opposing face thereof being suitably notched as at 74 and 75 to provide a seat for blades 76 and 77. The blades 76 and 77 are each provided with a plurality of apertures 78 to receive threaded studs 78' therethrough for detachable connection with the arms 72—73 and present ground inclined edges 79 and 80 that cooperate with and just touch the ground cutting edge 58 of the stationary blade 53.

The mounting of the rotary cutter shaft 60 and the extension of the ground edges 79—80 of the blades 76—77 thereon, is such as to present a shearing action with the stationary blade edge 58 so that these are in contacting engagement during rotation of the shaft 60 to present self-sharpening cutting edges 58 and 79—80 in the path of the flat sheet material 29 that is intermittently fed along the top surface frame plate 17 through the medium of the endless conveyor belt 32 as will appear more fully hereinafter. It will be observed that the rotary cutter 59 is disposed above the endless conveyor 45 so that the strips 81 (Figures 6 and 7) of predetermined size that are sheared from the continuous sheet 29, will be disposed upon the endless belt 45 and fed beyond the forward standard 12 of the machine 10 to their desired destination for further conversion into an article of manufacture.

In order to provide the desired shearing cooperation between the stationary blade 53 and the rotary blades 76—77, the former is angularly adjustable to provide the desired coaction therebetween. This angular adjustment is effected through the medium of arms 82 fixed to the exteriorly projecting portions of the trunnions 55' which extends from the stationary blade mount 55 (Figure 8). As shown, the stationary blade mount adjusting arms 82 confronts oppositely disposed studs 83 and 84 which are threadedly mounted in bracket plates 85 and 86, respectively.

The bracket plates 85—86 are attached to the side plates 13 and 14 of the frame 10 by means of fasteners 87. Lock nuts 88 are provided on the adjusting studs 83—84 so as to hold the arm 82 in any desired angular position against accidental displacement. In consequence thereof, the stationary blade mount 55 can be adjusted to the desired angular position so that the ground blade edge 58 will be correctly disposed relative to the oppositely ground edges 79—80 of the rotary blades 76—77, thereby effecting a shearing reaction therebetween to cut a strip 81 from the sheet 29 as each rotary cutter 76—77 passes stationary cutter blade 53 with the sheet material 29 intermittently displaced therebetween.

During the shearing engagement between the cutters 53 and 76—77, a pronounced engagement is effected therebetween so that a clean shearing reaction takes place to provide clean-cut and non-fringed strips 81. During the shearing reaction between the blades 63 and 76—77, the sheet material 29 is intermittently held stationary during the moment of shearing engagement. Forward displacement of the sheet 29 is effected during the interim of rotation of blades 76—77 free from engagement with the stationary blade 53. The speed of linear displacement of the sheet 29 together with the rotary speed of the cutter mount 59, determines the width of the trips 81 as will be more fully described hereinafter. In other words, the sheet material 29 is momentarily held stationary for each one-half revolution of the rotary cutter 59 and its shaft 60 at the instant that each of the blades 76—77 effect shearing engagement with the edge 58 of the stationary blade 53.

Figure 5:
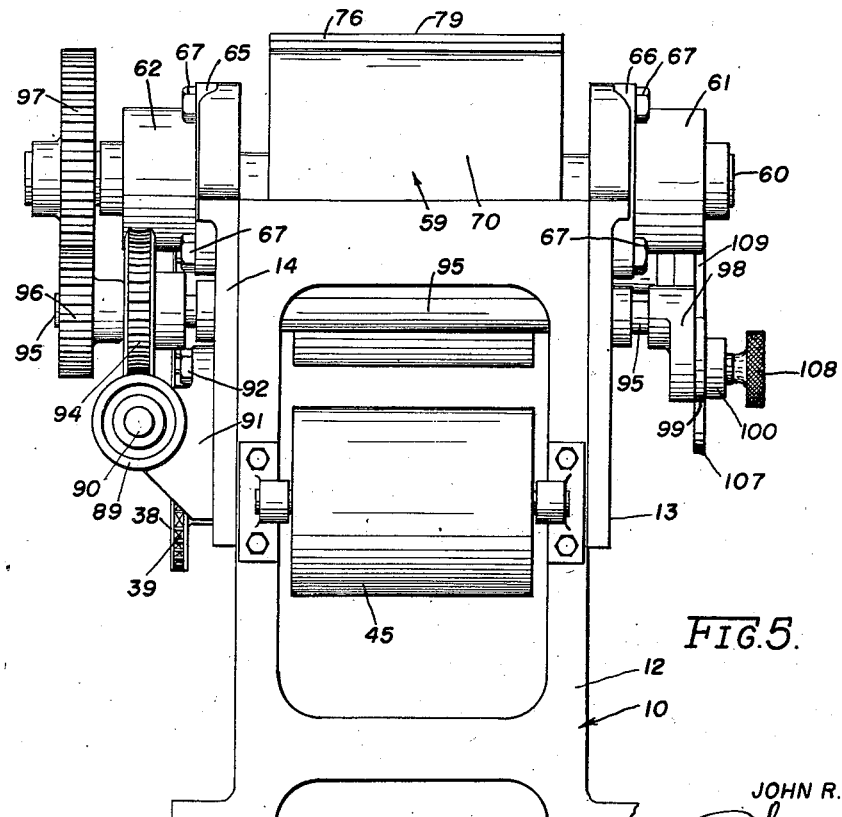
Figure 5 is a front view in elevation of the machine shown in Figures 1 and 4.
Figure 11:
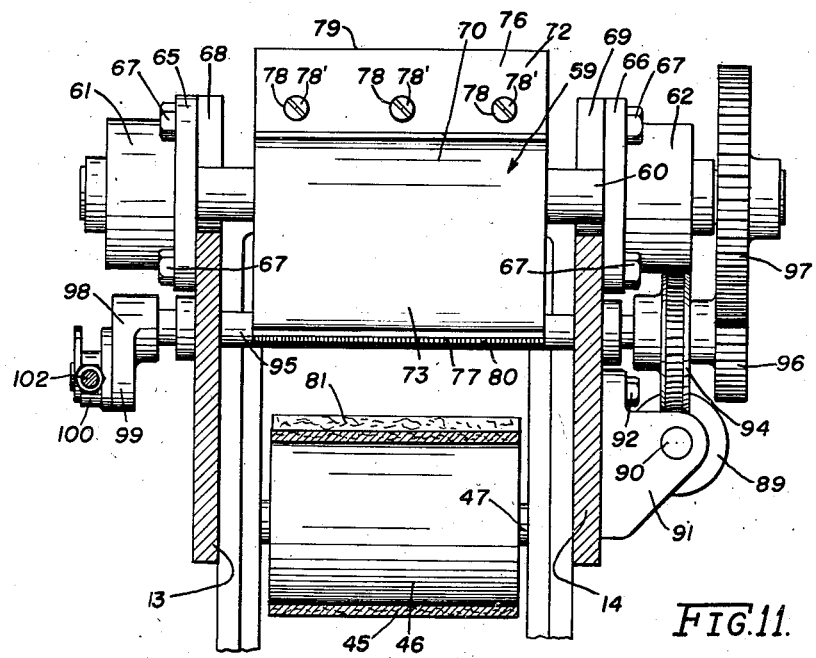
Figure 11 is a sectional view in elevation taken substantially along line XI—XI of Figure 1.

The above described operating instrumentalities are actuated from a common source of power such as an electric motor (not shown) preferably though not essentially having a V-grooved pulley fixed to and extending from the armature pulley thereof. A belt extends from the armature pulley (not shown) to a V-grooved pulley 89 to impart rotation thereto. The V-grooved pulley 89 is mounted on a stub shaft 90 journalled in a bearing bracket 91 fixed to the side frame plate 14 by means of fasteners 92 (Figures 5 and 8). The stub shaft 90 carries a worm 93 for rotation therewith on the bearing bracket 91 to mesh with a worm wheel 94 carried by a transversely disposed shaft 95.

The shaft 95 is journalled for rotation between the side plates 13—14 of the frame 10 (Figures 1 and 8) serving as a support therefor. The shaft 95 also carries a spur gear 96 that is smaller in diameter than the worm wheel 94, it being laterally positioned therebeyond to mesh with a comparatively larger spur gear 97 mounted on the cutter shaft 60 to impart continuous rotation to the cutter 59 and its blades 76—77 responsive to the rotation of the shaft 95. The shaft 95 extends beyond the opposite side frame plate 13 to receive a crank 98 that rotates therewith. The crank 98 has an offset arm 99 to rotatively receive the enlarged cylindrical split bearing end 100 of a connecting rod 110 having a bore correspondingly sized to the crank arm 99 for journalled rotation thereon.

The connecting rod 10 threadedly engages a pitman rod 102 (Figures 1, 4 and 5) that terminates at its forward end in a connecting rod 103 threadedly connected thereto. The connecting rod 103 has its enlarged bored portion 104 provided with a transverse pin 105 axially journalled therein for registry with an arcuate slot 106 provided in a correspondingly shaped pitman arm 107. A threaded and externally knurled retainer nut 108 extends axially from the pitman pin 105 for anchored threaded engagement therewith to maintain the connecting rod 103 with its pin 105 in any position of adjusted attachment in the arcuate slot 106 within the limits thereof.

As a result, the effective length of the arcuate arm 107 may be varied to change the extent of oscillation of the shaft 36 to determine the extent of displacement of the conveyor belt 32. The position of engagement of the connecting rod 103 along the arcuate slot 106 determines the amount of flat sheet material 29 that is displaced or fed along a predetermined path with each intermittent motion. The pitman arm 107 terminates in an enlarged circular chambered boss 109 which is axially bored as at 110 for operative connection through the medium of a standard pawl and ratchet mechanism 111—112 to the sprocket shaft 36. Consequently, the rotation of the crank 98 with its arm 99 will impart oscillatory movement to the pitman rod 102 that imparts oscillatory movement to the pitman arm 107.

Through the pawl and ratchet mechanism 111—112, the oscillatory movement of the arm 107 is converted into intermittent rotation of the shaft 36 which effects the intermittent linear displacement of the conveyor belts 32 and 45. The intermittent linear movement of the belts 32 and 45 is attained by virtue of the fact that the pitman arm 107 oscillates so that on the return stroke thereof, the shaft 36 and its dependent sprocket wheels 37—39 through the sprocket chain 38, render the conveyor belts 32—45, respectively, inactive.

To this end, the rotary cutter 59 continuously rotates on the shaft 60 to effect shearing engagement with the stationary cutter 55 during momentary inaction of the conveyor belts 33—45. During the moment of inaction of the sheet material 29, the rotary cutter blades 76—77 strike the stationary blade 53 to intermittently shear off strips 81 from the continuous flat sheet of material 29 that unreels from the spirally wound roll 27. The unreeling of the roll 27 is occasioned by the clockwise intermittent movement of the endless belt conveyor 32 which frictionally sustains the flat sheet material 29 thereon to effect gradual feeding thereof over the stationary cutter blade 53. It will be observed that the position of the pitman pin 105 in the arcuate slot 106 of the pitman arm 107, determines the extent of displacement of the conveyor belts 32—45 and corresponding feeding of the sheet material 29.

Various changes may be made in the embodiment of the invention herein specifically described without departing from or sacrificing any of the advantages of the invention or any features thereof, and nothing herein shall be construed as a limitation of the invention, its concept or structural embodiment as to the whole or any part thereof, except as defined in the appended claims.

I claim:

1. In a cotton strip cutting device of the character described, the combination with a frame, of endless belt feeding means on said frame for intermittently displacing sheet material along a predetermined path, a stationary blade cutter in said predetermined path, a crank-arm for operating said endless belt feeding means, rotary shearing means cooperating with said stationary blade cutter in said path, means for continuously operating said shearing and crank-arm means in timed relation with each other for severing said sheet material into strips of selected uniform size, endless belt means for conveying said sheared strips frome said shearing means along another predetermined path, and means for operatively interconnecting said endless belt feeding and strip conveying means.

2. In a cotton strip cutting device of the character described, the combination with a frame, of endless belt feeding means on said frame for intermittently displacing sheet material along a predetermined path, a stationary blade cutter in said predetermined path, an adjustable crank-arm for operating said endless belt feeding means, rotary multi-blade shearing means cooperating with said stationary blade cutter in said path, means for continuously operating said multi-blade shearing and crank-arm means in timed relation with each other for severing said sheet material into strips of any predetermined uniform size, endless belt means for conveying said sheared strips from said shearing means along another predetermined path, and means for operatively interconnecting said endless belt feeding and strip conveying means.

3. In a cotton strip cutting device of the character described, the combination with a frame, of crank-arm feeding means on said frame for intermittently displacing sheet material along a predetermined path, a stationary blade cutter in said predetermined path, means for adjusting the angular position of said stationary blade cutter, rotary multi-blade shearing means cooperating with said stationary blade cutter in said path, means for continuously operating said multi-blade shearing and crank-arm means in timed relation with each other for severing said sheet material into strips of uniform size, and means for varying crank-arm feeding means to regulate the size of the strips.

JOHN R. McLAUGHLIN.